Feb. 19, 1957 R. A. COVINGTON, JR., ET AL 2,781,894
TUBULAR FILM ADVANCER
Filed April 7, 1955 2 Sheets-Sheet 1

INVENTORS
ROBERT A. COVINGTON, JR
VINCENT H. WALDIN

BY Harry J. McCauley

ATTORNEY

Feb. 19, 1957 R. A. COVINGTON, JR., ET AL 2,781,894
TUBULAR FILM ADVANCER
Filed April 7, 1955 2 Sheets-Sheet 2

TUBULAR FILM INPUT

INVENTORS
ROBERT A. COVINGTON, JR.
VINCENT H. WALDIN

BY Harry J. McCauley

ATTORNEY

United States Patent Office 2,781,894
Patented Feb. 19, 1957

2,781,894

TUBULAR FILM ADVANCER

Robert A. Covington, Jr., and Vincent H. Waldin, Wilmington, Del., assignors to E. I. du Pont de Nemours and Company, Wilmington, Del., a corporation of Delaware Application April 7, 1955, Serial No. 499,826

2 Claims. (Cl. 203—270)

This invention relates to apparatus for advancing a tubular film or web, and particularly to a tubular film-advancing apparatus adapted for advancing a tubular film by the application of stresses to the inside surface of the tubular film while it is disposed in generally concentric relationship with respect to the apparatus with the inside surface of the tube in tight abutment therewith.

In the manufacture of films, which term as hereinafter employed is intended to encompass webs broadly, from polymeric substances, it is often necessary to support the film in tubular form internally while subjecting it to a temperature treatment adapted to either relax the film or cool the film after it has been stretched or otherwise treated by apparatus disposed ahead of the advancing equipment. The apparatus of this invention is adapted to support tubular film stock internally while advancing it longitudinally, to thereby permit a desired chemical stabilization in the course of manufacturing the film in a continuous type process.

Figure 1:
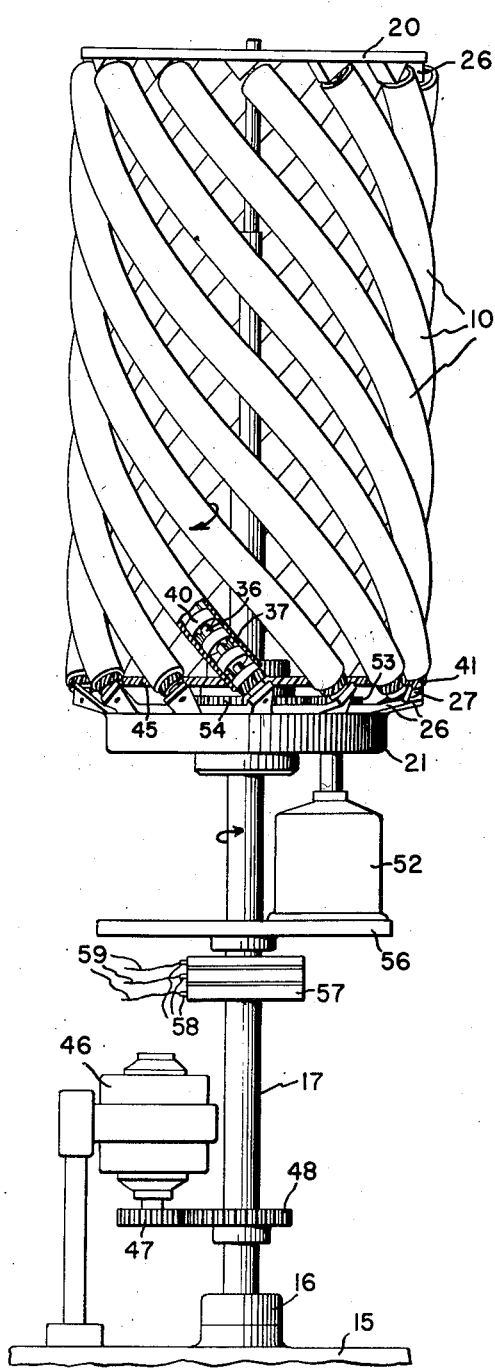
Figure 2:
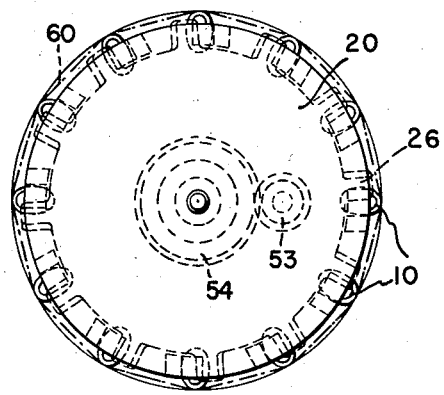
Figure 4:
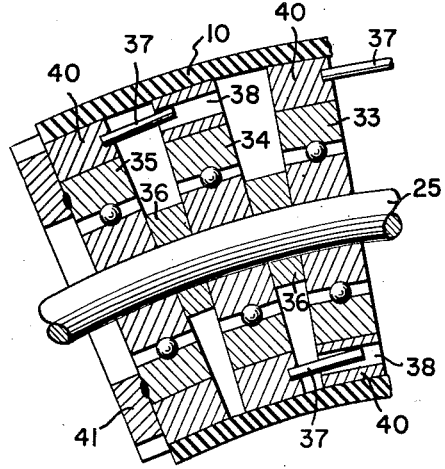
Figure 3:
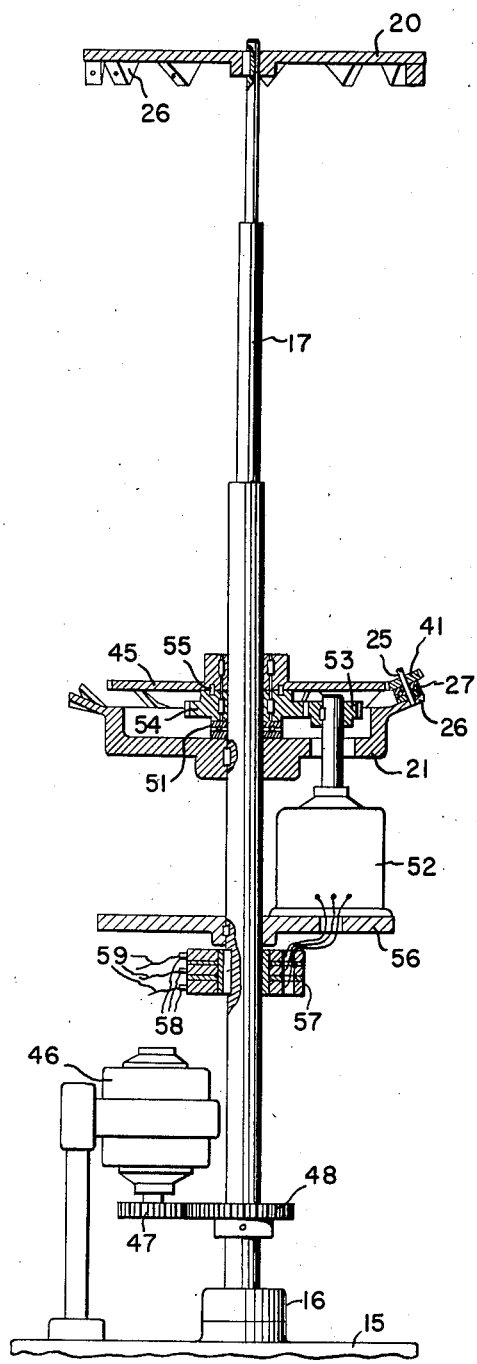
Figure 5:
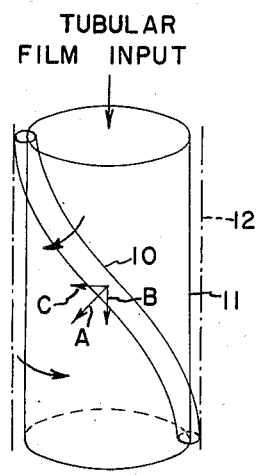

An object of this invention is to provide a tubular film-advancing apparatus which does not mar the film in the course of manufacture. Another object of this invention is to provide a tubular film-advancing apparatus which is adapted for use in conjunction with tubular film-stretching apparatus. Another object of this invention is to provide a tubular film-advancing apparatus which is compact in arrangement, economical to fabricate and which is suited to shielding or jacketing to preserve desired internal film-processing temperatures. The manner in which these and other objects of this invention are obtained will become apparent from the detailed description and the following drawings in which:

Fig. 1 is a side elevation view of a preferred embodiment of this invention having twelve equal sized film-advancing rolls arranged in a helical pattern as shown in Fig. 5, a portion of the resilient sleeve of one of the rolls being cut away to show the driving transmission of the roll, Fig. 2 is a top plan view of the apparatus of Fig. 1, the disposition assumed by a tubular film in the course of advancing being indicated in broken line representation, Fig. 3 is a vertical sectional view of the support structure of the apparatus of Fig. 1 shown without the film-advancing rolls but with the drive end of a single roll detailed, Fig. 4 is a sectional view of the driving end of a portion of the film-advancing-roll transmission shown in cut-away detail in Fig. 1, and Fig. 5 is a diagrammatic perspective view showing the disposition in helical pattern with respect to the support points of a single film-advancing roll according to Fig. 1, together with a cylindrical solid of revolution bounded by the convergent helical pattern envelope defined by the axes of a multiplicity of film-advancing rolls identical with the one detailed, the envelope limits of the tubular web in the course of advance being indicated in broken line representation around the outside of the apparatus.

Generally, the apparatus of this invention comprises a power-driven rotatable support means over which the tubular film is advanced axially and in concentric relationship therewith, provided with a multiplicity of film-advancing rolls having resilient sleeves, each formed similarly with equal diameters throughout, the film-advancing rolls being rotatably mounted on the support means with the axes of the rolls fixed with respect to the support means and curved in similar helical patterns at substantially the same angle with respect to the elements of a cylinder bounded by the helical patterns, the angular disposition being in the range of between about 1° and about 89°, and driving means connected with each of the rolls rotating the rolls at substantially the same angular velocity in the same direction for advance of the tubular film over the apparatus, the support means being driven in a direction and at a velocity such as to counterbalance precisely all velocity components in planes normal to the direction of tubular film input imparted to the tubular film by contact of the film-advancing rolls with the interior surface of the film.

The apparatus of this invention incorporates a multiplicity of film-advancing rolls which have equal diameters throughout but which drive the film parallel to the axis of the apparatus by frictional engagement with the interior of the film tube. The term "roll," as hereinafter used, is intended to comprise the external elastomeric sleeve which contacts the inside surface of the tubular film to be advanced in assembly with the transmission which rotates the sleeve, all as completely set out in the detailed description.

Referring to Figs. 1, 4 and 5, the elastomeric sleeve 10 of a film-advancing roll, before it is assembled in helical pattern arrangement as hereinafter described, possesses an external shape of a cylinder. The details of the driving transmissions for the rolls fitted with elastomeric sleeves 10 are described hereinafter in greater detail, and a preferred construction of transmission is the subject matter of our copending application S. N. 499,775. It should be mentioned that the construction of the film-advancing rolls, of which the sleeves are the external elements contacting the tubular film, is such that the rolls can be disposed in a helical configuration with respect to the axis of the machine support structure for the rolls and the rolls can, at the same time, be rotated about their individual axes so as to apply frictional forces through the roll sleeves to the tubular film, thus advancing the film axially over the outside of the apparatus.

The disposition of the film-advancing rolls provided with the sleeves 10 is shown diagrammatically in relation with the support means in Fig. 5, the roll axes following helical patterns in the direction of tubular film input, indicated by the arrow. The solid of revolution bounded by the envelope defined by a multiplicity of the axes of rolls disposed similarly to the single roll shown in Fig. 5 in a cylinder, indicated at 11.

It is essential to the proper operation of the apparatus of this invention that all of the rolls of each particular apparatus be disposed at substantially the same angle with respect to the elements of the cylinder bounded by the helical patterns characteristic of the particular apparatus, and that this angle be within the range of about 1° to about 89°. It is preferred to employ dispositions of axes with respect to elements larger than about 30°, because, the larger the angles are, the greater the rate of film throughput and consequently of product manufactured, and also the larger this angle is the greater is the number of contacts between the film and the rolls along lines parallel to the elements of the cylinder defined by the patterns of axes. Disposition of the roll axes at angles greater than 30°, however, complicates the problem of shaft support and the maintenance of shaft stiffness during operation, for which reasons dispositions of the shafts at 30° or slightly more are preferred.

The construction of a preferred embodiment of apparatus according to this invention is shown in Figs. 1–4, disposed with its axis vertical for input of the film from the top with exit below the rolls, followed by slitting to a plane sheet and thereafter withdrawing the film to subsequent processing apparatus without interference from the machine supports and powering devices.

As shown in Figs. 1 and 3 particularly, the apparatus comprises a base plate 15 provided with a thrust bearing 16 in which is journaled the vertical main shaft 17. The main shaft supports the film-advancing rolls, the driving means for these rolls and the immediate structure on which the rolls are mounted.

The film-advancing rolls are supported by an upper circular plate member 20 and a lower circular plate member 21, both of which are keyed to shaft 17 and consequently rotate in unison therewith. The construction of the film-advancing rolls is such that the roll shafts are fixedly secured to plates 20 and 21, with the axes disposed in helical patterns lying along the surface of a cylinder, the rolls being rotatably mounted with respect to the roll shafts. A preferred construction of the rolls utilizes a transmission incorporating a plurality of bearings as the journaling means between the roll sleeves and shafts by employing the arrangement detailed in Figs. 1 and 4, which transmission is the subject matter of our copending application S. N. 499,775, hereinbefore referred to.

As shown in Fig. 1, the roll shafts 25 are preformed to the shape of the helix in which it is desired to dispose the rolls, the ends of the shafts being fixedly secured to plates 20 and 21, as by providing the shafts with square ends engaging with mating holes in the plates. It may be convenient as an aid in orienting the shafts properly to provide plates 20 and 21 with serrated edges disposed in opposition affording individual inclined faces 26 for support of the shafts. Each film-advancing roll is preferably provided with a thrust bearing 27 interposed between the roll driving gears 41 and the faces 26 of lower plate 21.

Since the load on shafts 25 is uniform at all points along the path of film-advancing, a uniform diameter shaft may be utilized as shown in Fig. 4 for the support of the rolls. Referring to Fig. 4, the roll driving transmission comprises a multiplicity of conventional bearing assemblies 33, 34 and 35, separated one from another by spacers 36, the inner races of the bearings of which are preferably tight on shaft 25, while the outer races are free to rotate around the shaft, the spacing of successive bearings being sufficient to avoid interference therebetween.

The outer races of the bearings are preferably provided with metal sleeves 40 which are shrunk on or otherwise fixedly secured to the outer races. Metal sleeves 40 are preferably all of the same outside diameter and the outside peripheries may be knurled or otherwise roughened to provide a good driving connection with the inside surfaces of the elastomeric sleeves 10 into the bores of which sleeves 40 fit snugly. Metal sleeves 40 are provided with one or more drive pins 37 which register with mating cylindrical passages 38 on adjacent sleeves so that, as the outer bearing races and their associated metal sleeves rotate from a position of maximum separation, the ends of the drive pins are free to move axially without interference. The transmission bearings, such as 33, 34 and 35, are preferably of the sealed-in lubricant type to eliminate servicing after installation and may employ silicone type lubricants where relatively high temperature duty is required.

An alternate design of roll driving transmission can utilize a flexible hollow cable in place of the bearings represented at 33—35, the cable being supported internally by the roll shafts 25 in a construction resembling the conventional speedometer tube drives which are standard automobile equipment.

Each roll is provided with drive gear 41 which is welded or otherwise fixedly secured to the lower end of the outer race of the lowermost bearing 35. As shown in Figs. 1 and 2, gears 41 are disposed clear of the lower ends of elastomeric sleeves 10 and also of the tubular web drawn over the apparatus, and engage with bull gear 45 journaled on main shaft 17. The drive described involves a pair of non-intersecting shafts and thus requires the use of gearing such as that commercially available from the Vinco Corp., Detroit, Michigan, under the trade name "Beveloid."

As hereinafter described, the film-advancing rolls rotate about their axes in a direction opposite to the rotation of the main supporting structure, inclusive of plates 20 and 21. A convenient driving arrangement includes a shaft driving motor 46 provided with a drive pinion 47 which engages with gear 48 keyed to shaft 17. A second motor 52 is provided for the drive of the individual rolls, the shaft of this motor carrying drive pinion 53 engaging with gear 54 secured to bull gear 45, journaled on shaft 17, by keys 55. A thrust bearing 51 is provided to take the downward load imposed by gears 45 and 54 on lower plate member 21. Drive motor 52 is mounted on a rotatable platform member 56 keyed to shaft 17. The power for motor 52 is supplied through the conventional three-ring commutator assembly indicated generally at 57, which is provided with stationary brushes 58 connected to a suitable power supply through leads 59.

It will be understood that the length of the roll sleeves measured over the outside limits of the helical course of the roll shafts is greater than the length of the sleeves measured over the inside limits of the helical course of the roll shafts and, accordingly, roll sleeves 10 must be fabricated from material sufficiently resilient to accommodate for this difference in lengths. A great variety of elastomeric materials are suitable for the purpose, the chief requirements, in addition to accommodation in shape during rotation around a helically disposed axis, being that the material be relatively incompressible in the course of advancing the film and possess a coefficient of friction sufficient to preclude slippage of the film relative to the sleeve. For the usual service necessitating the employment of elevated temperatures for relaxation of the film during the advancing operation, silicone rubber is completely satisfactory. It is well known that the service life of elastomers is adversely affected by the repetitive application of tensile and compressive loads and it is, therefore, preferred that sleeves 10 be mounted on the transmissions so that slight tension exists in the sleeves even along the short length portions of their expanses.

Sleeves 10 may be molded to their cylindrical forms prior to assembly and then pulled over the transmission assemblies or may, in fact, be molded directly on the transmissions, using a cloth or other flexible backing to prevent entrance of the flowable elastomer to the interspaces between successive bearing units. The sleeves may be finished to the desired final dimensions by cutting or abrading either prior to or after the sleeves are assembled on the associated transmissions.

Referring to Fig. 5, and Figs. 1–3, it will be understood that, in operation, tubular film 12 is supplied to the apparatus of this invention from some point above the apparatus, entering in the direction of the arrow shown in Fig. 5. Operation of the apparatus of this invention entails advancing the tubular film by the application of frictional stresses to the inside of the tube through the rotation of the film-advancing rolls around their helically disposed axes, while at the same time counterbalancing any velocity components which tend to displace the films circumferentially of the apparatus.

The tubular film is, of course, flexible and is drawn over the outside of the apparatus in generally concentric relationship therewith, assuming a polygonal cross-sectional configuration such as is shown at 60 in Fig. 2. As shown in Fig. 5, if the roll carrying sleeve 10 rotates about its axis, which is constrained from rotation by attachment at the upper and lower ends to the support construction, it will be apparent that each roll will apply velocity components to the inside surface of the enveloping web 12. The resultant velocity at a particular point under consideration is that indicated at A, which lies in a plane normal to the axis of the roll. Vector A can be resolved into its components lying in a plane parallel to the central axis of the device, i. e., vector B, and in a plane normal to the central axis, i. e., vector C. To avoid twisting the tubular film in the course of advancing, it is necessary to move the film linearly, that is, parallel to the axis of cylinder 11. Linear translation is effected by the precise counterbalancing of all velocity components C by rotation of the support structure at exactly the correct velocity in the reverse direction to the rotation of the film-advancing rolls, so that the only net velocity imparted to the tubular film will be that represented by longitudinally directed vector B. Under these circumstances, rotation of the rolls will accomplish longitudinal advancement of the film without any twisting.

Film delivered from apparatus constructed according to this invention can be slit axially into a flat sheet by a knife, and the sheet trained off out of contact with the appurtenances at the machine base for winding on receiving mandrels or similar devices not shown.

Where it is desired to maintain the temperature of the film being advanced at a higher level than room temperature, this can be conveniently accomplished by enclosing the upper part of the apparatus, including the advancing rolls, within a housing which is either provided with radiant heaters or through which is circulated heated air to effect quick heating of the web in process. It is oftentimes desirable to utilize apparatus constructed according to this invention in series disposition with a tubular film-stretching apparatus such as that disclosed in our copending application S. N. 499,825, wherein spirally disposed rolls of progressively increasing diameter are employed as the stretching elements. If desired, the tubular web-advancing mechanism of this invention can be made integral with the stretching apparatus by extending the advancing rolls in spiral pattern in the direction of film input as described in application S. N. 499,825, thereby providing an apparatus adapted to both stretch and advance the tubular film in sequence. For the latter construction, it will be understood that the rolls can be driven from the shaft of the apparatus by a single bull gear as has already been described for the tubular film-advancing apparatus.

From the foregoing it will be understood that the tubular film-advancing apparatus of this invention can be modified in many ways without departure from the essential spirit of the invention, for which reason it is intended to be limited only by the scope of the following claims.

What is claimed is:

1. An apparatus for advancing a tubular film by axial progression thereover in generally concentric relationship therewith comprising in combination a power-driven rotatable support means, a multiplicity of rolls provided with external resilient sleeves having substantially equal uniform diameters, said rolls being rotatably mounted on said support means with the axes of said rolls fixed with respect to said support means and curved in helical patterns at substantially the same angle with respect to the elements of a cylinder bounded by said helical patterns, said angle being in the range of between about 1° and about 89°, first driving means revolving each of said rolls at substantially the same angular velocity in the same direction for advance of said tubular film over said apparatus and second driving means revolving said support means in a direction opposite to the direction of rotation of said rolls and at an angular velocity such as to counterbalance precisely all velocity components in planes normal to the direction of tubular film input imparted to said tubular film by contact of said sleeves with the interior surface of said tubular film.

2. An apparatus for advancing a tubular film by axial progression thereover in generally concentric relationship therewith comprising in combination a central shaft, powered means in rotational driving connection with said central shaft, a pair of circular members of diameter less than the inside diameter of said tubular film fixedly secured to said central shaft at a distance apart along said shaft equal to the distance which it is desired to advance said film, a multiplicity of rolls provided with external resilient sleeves disposed around the peripheries of said circular members with said sleeves extending radially beyond said circular members substantially equal amounts, each of said rolls being rotatably mounted on individual shafts curved in helical patterns at substantially the same angle with respect to the elements of a cylinder bounded by said helical patterns, said angle being in the range of between about 1° and about 89°, the ends of said last-mentioned shafts being fixedly secured to said circular members, first driving means revolving each of said rolls at substantially the same angular velocity in the same direction for advance of said tubular film over said apparatus and second driving means revolving said central shaft and said circular members in a direction opposite to the direction of rotation of said rolls and at an angular velocity such as to counterbalance precisely all velocity components in planes normal to the direction of tubular film input imparted to said tubular film by contact of said rolls with the interior surface of said tubular film.

References Cited in the file of this patent
UNITED STATES PATENTS

| | | |
|---|---|---|
| 2,317,747 | Ewing | Apr. 27, 1943 |
| 2,658,256 | Van Dijck | Nov. 10, 1953 |